(12) United States Patent
Hara et al.

(10) Patent No.: US 7,062,860 B2
(45) Date of Patent: Jun. 20, 2006

(54) METHOD AND DEVICE FOR MEASURING WHEEL ALIGNMENT OF CAR

(75) Inventors: Kiyonobu Hara, Sayama (JP); Katsuhiro Yamaguchi, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 19 days.

(21) Appl. No.: 10/512,946

(22) PCT Filed: Jun. 3, 2003

(86) PCT No.: PCT/JP03/07003

§ 371 (c)(1),
(2), (4) Date: Nov. 1, 2004

(87) PCT Pub. No.: WO03/102503

PCT Pub. Date: Dec. 11, 2003

(65) Prior Publication Data

US 2005/0178015 A1  Aug. 18, 2005

(30) Foreign Application Priority Data

Jun. 4, 2002 (JP) ............................. 2002-163256
Jun. 4, 2002 (JP) ............................. 2002-163257

(51) Int. Cl.
*G01B 21/26* (2006.01)
(52) U.S. Cl. .................................................. 33/203.12
(58) Field of Classification Search ............. 33/203.12, 33/203, 203.13, 203.14
See application file for complete search history.

(56) References Cited

U.S. PATENT DOCUMENTS

| 3,823,485 A | * | 7/1974 | Lambrecht ............... 33/203.14 |
| 3,876,310 A | * | 4/1975 | Berndt ........................ 356/155 |
| 5,327,655 A | | 7/1994 | Buchesky et al. ............. 33/288 |
| 5,598,357 A | * | 1/1997 | Colarelli et al. ............ 700/279 |
| 6,058,614 A | * | 5/2000 | Shibayama et al. ........... 33/203 |
| 6,256,894 B1 | * | 7/2001 | Naruse et al. ........... 33/203.12 |

FOREIGN PATENT DOCUMENTS

| JP | 7-151503 A | 6/1995 |
| JP | 2000-146567 A | 5/2000 |

* cited by examiner

Primary Examiner—Christopher W. Fulton
(74) Attorney, Agent, or Firm—Birch, Stewart, Kolasch & Birch, LLP (57) ABSTRACT

An automobile body 2 with a wheel mount 5 vertically movably mounted thereon is supported, and the wheel mount 5 is lifted to an adjusting position which is set so as to be lower than the position that the wheel mount 5 takes when the automobile is running. The position of the wheel mount 5 as it is lifted and toe and camber angles thereof are measured, and estimated values of the toe and camber angles at the position that the wheel mount 5 takes when the automobile is running are calculated based on the measured values. Thereafter, adjustment quantities for the toe and camber angles at the adjusting position are calculated, and wheel alignment is adjusted at the adjusting position based on the adjustment quantities. Wheel alignment of the automobile can be measured and adjusted quickly and accurately for increased productivity without applying the same load to the automobile body as the load that is applied when the automobile is running.

4 Claims, 7 Drawing Sheets

METHOD AND DEVICE FOR MEASURING WHEEL ALIGNMENT OF CAR

TECHNICAL FIELD

The present invention relates to a method of and an apparatus for measuring wheel alignment of automobiles.

BACKGROUND ART

Heretofore, there is known a technique for measuring and adjusting wheel alignment of automobiles from Japanese patent No. 2938984. In the patent, wheel alignment is measured on a wheel mount, with no wheel installed thereon, on an assembly line for assembling automobile bodies, for thereby increasing productivity.

According to the technique of the type described above, on an assembly line for assembling automobile bodies, after a steering device and suspensions have been installed on an automobile body that is carried by a hanger, the automobile body is removed from the hanger, and is vertically movably supported by wheel mounts that have been installed on the automobile body by the installed suspensions. Then, connectors such as chains or the like of a lowering means for lowering the automobile body are connected to front and rear portions of the automobile body, and operated to lower the automobile body to impart a predetermined load to the automobile body. The suspensions are now given a biasing force corresponding to the predetermined load under a reactive force from the wheel mounts, thus fixing the automobile body in a state closest to a running state when the automobile is completed with wheels mounted on respective axles. While the automobile is maintained in the above state, wheel alignment is measured on the wheel mounts, and then adjusted based on the measured results.

According to the above conventional process, however, since a state closest to the running state needs to be reproduced for the automobile body, it is necessary to pull the automobile body removed from the hanger downwardly with the lowering means before wheel alignment is measured and adjusted. Therefore, the conventional process is disadvantageous in that it is inefficient as relatively many man-hours are involved in measuring and adjusting wheel alignment.

When the automobile body is pulled downwardly by the lowering means, it may be difficult to apply the load uniformly to the four wheel mounts depending on the positions where the chains or the like of the lowering means are connected, resulting in a reduction in the accuracy with which to measure wheel alignment and a failure to adjust wheel alignment accurately.

DISCLOSURE OF THE INVENTION

It is an object of the present invention to provide a method of and an apparatus for measuring and adjust wheel alignment of an automobile quickly and accurately for increased productivity without applying the same load to wheel mounts as the load that is applied when the automobile is running.

A method of measuring wheel alignment of an automobile according to the present invention measures a tilt angle in a predetermined direction of a wheel mount on the automobile body. The tilt angle in the predetermined direction of the wheel mount may specifically be a toe angle or a camber angle, which can easily be measured. The method of measuring wheel alignment according to the present invention will be described below on the assumption that the tilt angle in the predetermined direction of the wheel mount is a toe angle.

First, a wheel mount lifting process is carried out in which the automobile body is supported with the wheel mount vertically movably mounted thereon, and the wheel mount is lifted to a predetermined vertical position which is set so as to be lower than the position that the wheel mount takes when the automobile is running.

The vertical position to which the wheel mount is lifted may, for example, be a vertical position where the automobile body supported by a hanger on an assembly line for assembling automobile bodies is prevented from being lifted with the wheel mount off the hanger. Therefore, the automobile body is stably supported without being lifted off the hanger, allowing the toe angle of the wheel mount to be measured.

Then, a measuring process is carried out to measure the position of the wheel mount which is lifted in the wheel mount lifting process and a tilt angle thereof. In the measuring process, a first calculating process and a second calculating process are carried out.

In the first calculating process, the position of the wheel mount is measured when the wheel mount starts being lifted in the wheel mount lifting process is measured, and the toe angle in the measured position is measured, and coordinates represented by the measured position and toe angle are referred to as first reference coordinates. Then, the positions of the wheel mount are measured at predetermined intervals while the wheel mount is being lifted to the predetermined vertical position, and the toe angles in the respective measured positions are measured, and a plurality of coordinates represented by the measured positions and toe angles are referred to as measured coordinates. Then, the gradients of straight lines respectively interconnecting the first reference coordinates and the measured coordinates are calculated.

In the second calculating process, the differences between the gradients of straight lines respectively interconnecting second reference coordinates, which have been calculated in advance, and set coordinates and the gradients of the straight lines respectively interconnecting the first reference coordinates and the measured coordinates are calculated. The second reference coordinates comprise coordinates representative of the position of the wheel mount at the first reference coordinates (i.e., the position where the wheel mount starts being lifted in the wheel mount lifting process) and a predetermined correct toe angle at the position of the wheel mount. The set coordinates comprise a plurality of coordinates representative of the respective positions of the wheel mount at the measured coordinates (e.g., the positions of the wheel mount that are measured at predetermined intervals while the wheel mount is being lifted to the predetermined vertical position) and predetermined correct toe angles at the positions of the wheel mount.

The inventor of the present invention has conducted various tests on changes in toe angles and camber angles and found that the differences the gradients of the straight lines interconnecting the second reference coordinates and the set coordinates and the gradients of the straight lines interconnecting the first reference coordinates and the measured coordinates make a constant change with respect to the position of the wheel mount.

In the second calculating process, an estimated value of the toe angle of the wheel mount at the position that the wheel mount takes when the automobile is running is calculated based on the gradients of the straight lines interconnecting the second reference coordinates and the set coordinates and the gradients of the straight lines interconnecting the first reference coordinates and the measured coordinates. It is thus possible to calculate the toe angle at the position that the wheel mount takes when the automobile is running without actually bringing the wheel mount to the position that the wheel mount takes when the automobile is running. Therefore, the toe angle can be measured efficiently within a short period of time without the need for applying the same load to the automobile body as the load applied when the automobile is running.

According to the present invention, the camber angle can also be measured in the same manner as with the toe angle. Consequently, by measuring the position of the wheel mount that is lifted to the predetermined vertical position which is set so as to be lower than the position that the wheel mount takes when the automobile is running in the wheel mount lifting process, and also the camber angle of the wheel mount, it is possible to calculate the camber angle at the position that the wheel mount takes when the automobile is running. Therefore, the camber angle can be measured efficiently within a short period of time without the need for applying the same load to the automobile body as the load applied when the automobile is running.

The method of measuring wheel alignment according to the present invention makes it easy to adjust the toe angle and the camber angle. If the tilt angle, to be adjusted, in the predetermined direction of the wheel mount is the toe angle, then a wheel mount lifting process is carried out to support the automobile body with the wheel mount vertically movably mounted thereon and lift the wheel mount to a toe angle adjusting position which is set so as to be lower than the position that the wheel mount takes when the automobile is running.

The toe angle adjusting position may be a vertical position where the automobile body supported by the hanger on the assembly line is prevented from being lifted with the wheel mount off the hanger. Therefore, the toe angle can be adjusted while the automobile body is being supported by the hanger.

Then, a measuring process is carried out to measure the position of the wheel mount lifted in the wheel mount lifting process and the toe angle thereof. In the measuring process, the first calculating process, the second calculating process, and a third calculating process are carried out. The first calculating process and the second calculating process are as described above. The second calculating process calculates an estimated value of the toe angle at the position that the wheel mount takes when the automobile is running.

In the third calculating process, a deviation from the correct toe angle at the position that the wheel mount takes when the automobile is running is determined from the estimated value obtained in the second calculating process. The deviation corresponds to the correct toe angle at the position that the wheel mount takes when the automobile is running. The toe angle adjusting position is set so as to be lower than the position that the wheel mount takes when the automobile is running. After the deviation is determined, a predetermining corrective quantity corresponding to the toe angle adjusting position is added to the deviation thereby to calculate an adjustment quantity for the toe angle of the wheel mount at the toe angle adjusting position.

Then, a toe angle adjusting process is carried out to adjust the toe angle of the wheel mount that has been lifted to the tilt angle adjusting position in the wheel mount lifting process. In the wheel mount lifting process, the toe angle is adjusted based on the adjustment quantity.

In this manner, it is possible to adjust the toe angle at the position that the wheel mount takes when the automobile is running without actually bringing the wheel mount to the position that the wheel mount takes when the automobile is running. Therefore, the toe angle can be adjusted efficiently within a short period of time without the need for applying the same load to the automobile body as the load applied when the automobile is running.

If the tilt angle, to be adjusted, in the predetermined direction of the wheel mount is the camber angle, then the camber angle can be adjusted in the same manner as with the toe angle. According to the present invention, therefore, the camber angle can be adjusted in a camber angle adjusting position that is set so as to be lower than the position that the wheel mount takes when the automobile is running in the wheel mount lifting process. Therefore, the camber angle can be adjusted efficiently within a short period of time without the need for applying the same load to the automobile body as the load applied when the automobile is running.

An apparatus for measuring wheel alignment according to the present invention serves to carry out the method of measuring wheel alignment according to the present invention, and is capable of easily measuring a toe angle or a camber angle. The apparatus according to the present invention comprises automobile body support means for supporting an automobile body with a wheel mount vertically movably mounted thereon, wheel mount lifting means disposed below the automobile body supported by the automobile body support means, for lifting the wheel mount to a predetermined vertical position which is set so as to be lower than the position that the wheel mount takes when the automobile is running, first measuring means mounted on the wheel mount lifting means, for measuring a vertical position of the wheel mount, second measuring means mounted on the wheel mount lifting means, for measuring a tilt angle in a predetermined direction of the wheel mount, measurement control means for controlling the first measuring means to measure the vertical position of the wheel mount at predetermined intervals after the wheel mount starts being lifted by the wheel mount lifting means until the wheel mount is lifted to a predetermined vertical position, and controlling the second measuring means to measure the tilt angle in the predetermined direction of the wheel mount, and tilt angle calculating means for calculating the tilt angle in the predetermined direction of the wheel mount at the position that the wheel mount takes when the automobile is running, based on measured values produced by the first measuring means and the second measuring means.

For measuring a toe angle with the apparatus according to the present invention, the automobile body support means supports the automobile body. At this time, the automobile body may be supported with the wheel mount vertically movably mounted thereon. Specifically, a hanger for feeding automobile bodies along an automobile body assembly line may be used as the automobile body support means.

Then, the wheel mount lifting means lifts the wheel mount on the automobile body that is supported by the automobile body support means. At this time, the automobile body support means lifts the wheel mount to the predetermined vertical position which is set so as to be lower than the position that the wheel mount takes when the automobile is running.

The measurement control means controls the first measuring means to measure the vertical position of the wheel mount and also controls the second measuring means to measure the toe angle of the wheel mount when the wheel mount is lifted by the wheel mount lifting means. Specifically, the measurement control means controls the first measuring means to measure the position where the wheel mount starts being lifted by the wheel mount lifting means and also measure vertical positions of the wheel mount at predetermined intervals until the wheel mount is lifted to the predetermined vertical position. The measurement control means controls the second measuring means to measure toe angles at the respective vertical positions at the same time that the vertical positions of the wheel mount are measured.

Then, the tilt angle calculating means calculates the toe angle at the position that the wheel mount takes when the automobile is running, based on measured values produced by the first measuring means and the second measuring means. Since the toe angle at the position that the wheel mount takes when the automobile is running can be calculated by lifting the wheel mount to the predetermined vertical position, the toe angle can be measured without the conventional need for applying a load to the automobile body. Consequently, the toe angle at the time the automobile is running can reliably be obtained quickly with a simple apparatus arrangement.

For measuring a camber angle with the apparatus according to the present invention, as with the above process of measuring the toe angle, the position of the wheel mount that is lifted to the predetermined vertical position which is set so as to be lower than the position that the wheel mount takes when the automobile is running, and the camber angle thereof are measured, and the camber angle at the position that the wheel mount takes when the automobile is running is calculated by the tilt angle calculating means. Therefore, the camber angle can be measured without the conventional need for applying a load to the automobile body. Consequently, the camber angle at the time the automobile is running can reliably be obtained quickly with a simple apparatus arrangement.

BEST MODE FOR CARRYING OUT THE INVENTION

Figure 1:
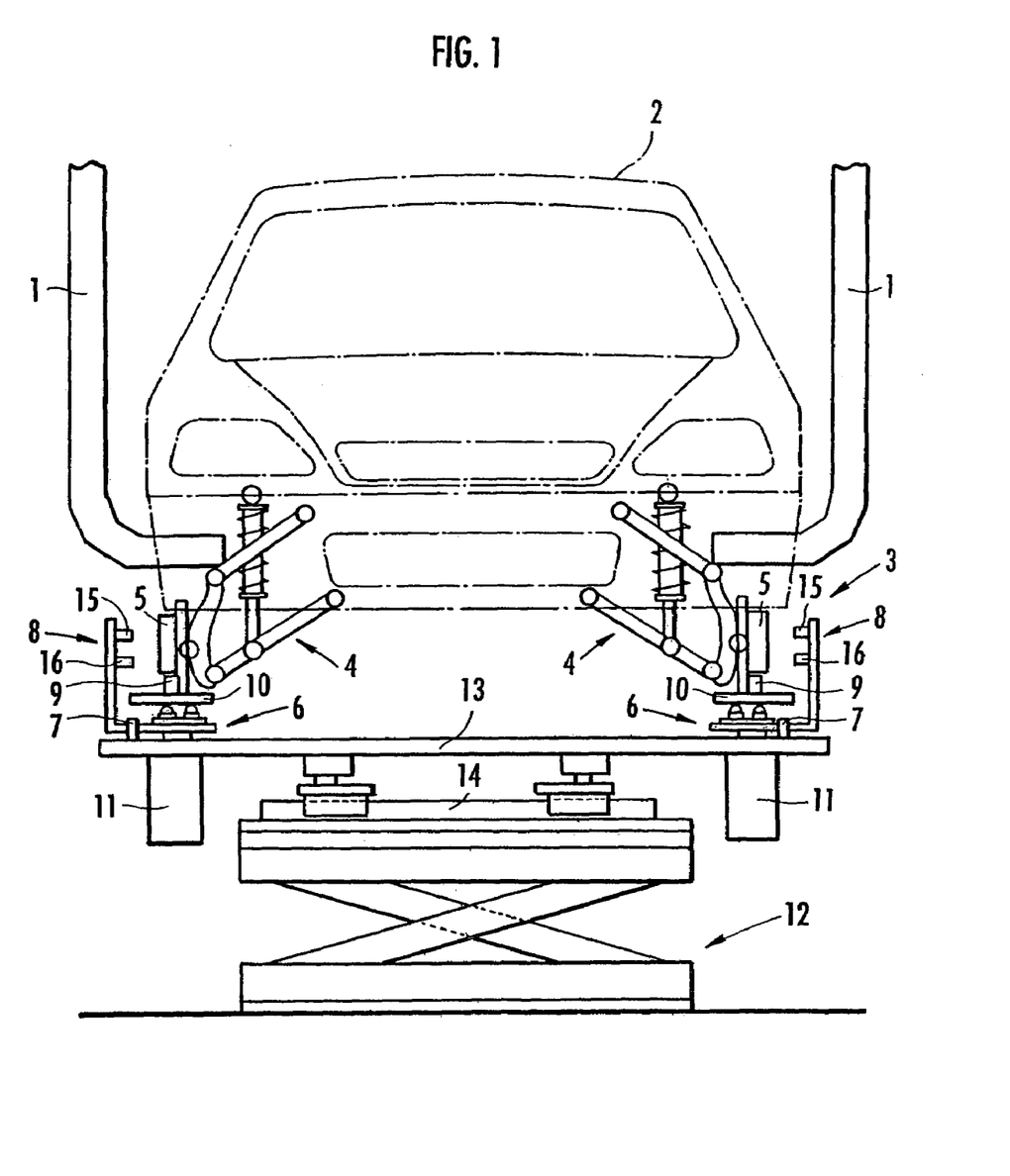
FIG. 1 is a view showing a general arrangement of an alignment measuring apparatus according to an embodiment of the present invention.

An embodiment of the present invention will be described below with reference to the drawings. As shown in FIG. 1, a hanger (automobile body support means) 1 for supporting an automobile body 2 feeds the automobile body 2 along an assembly line, not shown. An alignment measuring apparatus 3 according to the present embodiment is disposed below a feed path along which the automobile body 2 is fed by the hanger 1. The automobile body 2 as it is fed to a position directly above the alignment measuring apparatus 3 has a steering device and suspensions 4 that have been installed thereon on the assembly line, with the steering device adjusted to a neutral steering position. Wheel mounts 5 that have been attached to the automobile body 2 by the suspensions 4 have no wheels mounted thereon yet, and are vertically movably suspended on the automobile body 2 supported by the hanger 1.

As shown in FIG. 1, the alignment measuring apparatus 3 has wheel mount lifting means 6 for lifting the wheel mounts 5, first measuring means 7 for measuring the vertical position of the wheel mounts 5, and second measuring means 8 for measuring toe angles and camber angles of the wheel mounts 5. The first measuring means 7 and the second measuring means 8 are connected to a measurement control means, not shown, for controlling measurement at a plurality of positions, described later on. The measurement control means is connected to an arithmetic means (tilt angle calculating means), not shown. The arithmetic means calculates toe angles and camber angles from a plurality of measured values, described later on, that are obtained through the measurement control means.

Figure 2:
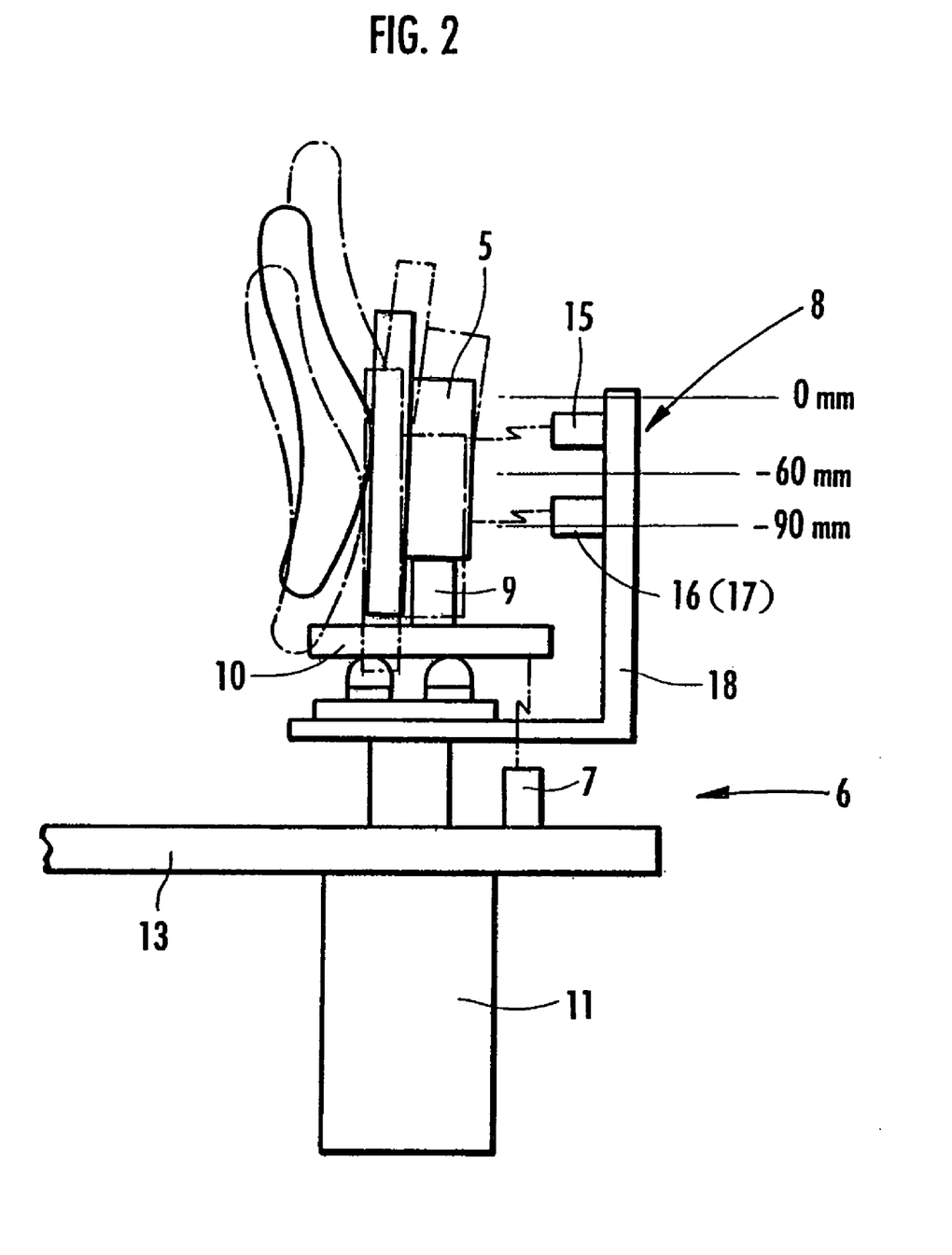
FIG. 2 is a view illustrative of the manner in which a wheel mount lifting means operates.

As shown in FIGS. 1 and 2, each of the wheel mount lifting means 6 comprises an abutment member 9 for abutting against the wheel mount 5 from a position therebeneath, a vertically movable lifting/lowering plate 10 supporting the abutment member 9 integrally thereon, and a cylinder 11 for causing the lifting/lowering plate 10 to lift the wheel mount 5 held in abutment against the abutment member 9.

As shown in FIG. 1, the cylinder 11 is supported on a support table 13 that is slidably supported on an upper portion of a lifting/lowering base 12 for sliding movement transversely across the automobile body 2. The lifting/lowering base 12 is lifted and lowered by a so-called pantograph. When the automobile body 2 fed by the hanger 1 passes above the alignment measuring apparatus 3, the lifting/lowering base 12 is lowered to prevent the alignment measuring apparatus 3 from interfering with the automobile body 2 as it is fed.

The support table 13 is slidably supported on rails 14 mounted on the upper portion of the lifting/lowering base 12 and extending transversely across the automobile body 2. The support table 13 is slidably moved by an actuating means, not shown. When the automobile body 2 is positioned directly above the alignment measuring apparatus 3, the actuating means positions the wheel mounts 5 and the abutment members 9 in alignment with each other.

Figure 3:
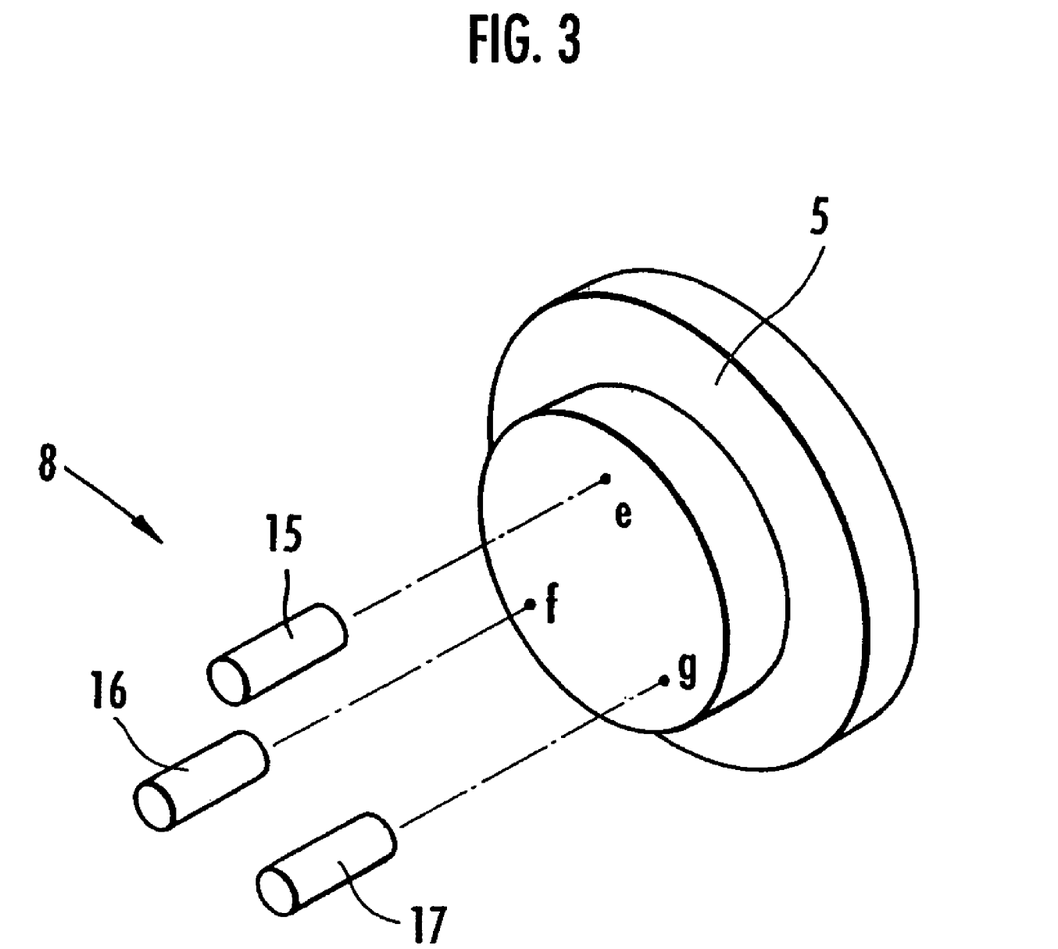
FIG. 3 is a view of a second measuring means.

As shown in FIGS. 1 and 2, each of the first measuring means 7 comprises a laser sensor mounted on the support table 13 for measuring a distance by which the lifting/lowering plate 10 is lifted, thus measuring the position of the central axis of the wheel mount 5. As shown in FIG. 3, each of the second measuring means 8 comprises three laser sensors (a first sensor 15, a second sensor 16, and a third sensor 17), and is integrally supported on a support member 18 (shown in FIG. 2) for being lifted and lowered by the cylinder 11. The first sensor 15, the second sensor 16, and the third sensor 17 face respective three points e, f, g on the wheel mount 5. The first sensor 15 measures a distance up to the point e on the wheel mount 5. The second sensor 16 measures a distance up to the point f on the wheel mount 5. The third sensor 17 measures a distance up to the point g on the wheel mount 5. Based on the differences between the distances measured by the first sensor 15, the second sensor 16, and the third sensor 17, a displacement in the vertical direction between the point e and a central point between the points f, g is measured, and a camber angle is detected from the measured displacement. Based on the difference between the distances measured by the second sensor 16 and the third sensor 17, a displacement in the horizontal direction between the points f, g is measured, and a toe angle is detected from the measured displacement.

A process of measuring and adjusting wheel alignment according to the present embodiment will be described below. As shown in FIG. 1, when the automobile body 2 is fed to a position directly above the alignment measuring apparatus 3, the lifting/lowering base 12 is lifted to bring the wheel mount lifting means 6 close to the wheel mounts 5.

Then, as shown in FIG. 2, the lifting/lowering plate 10 is lifted by the cylinder 11 until the abutment member 9 abuts against the wheel mount 5. At this time, the position of the central axis of the wheel mount 5 as it starts to ascend is measured by the first measuring means 7. At this time, the wheel mount 5 is in a position hanging from the automobile body 2. With the type of the automobile measured in the present embodiment, the position of the central axis of the wheel mount 5 is slightly below −90 mm from the position (0 mm) of the wheel mount 5 when the automobile is running.

The lifting/lowering plate 10 is further lifted by the cylinder 11 to elevate the wheel mount 5 until the position of the central axis of the wheel mount 5 reaches a position that is −60 mm from the position of the wheel mount 5 when the automobile is running. In the present embodiment, the position at −90 mm serves as a measurement start position for starting measurement, and the position at −60 mm serves as an adjusting position for adjusting toe and camber angles.

While the wheel mounts 5 are being lifted by the wheel mount lifting means 6, the measurement control means controls the measuring means to measure a plurality of positions of the wheel mounts 5 and toe angles and camber angles at the respective positions. In the present embodiment, the measurement control means controls the first measuring means 7 to detect when the wheel mounts 5 are positioned at −90 mm, −80 mm, −70 mm, and −60 mm from the position of the wheel mount 5 when the automobile is running, and also controls the second measuring means 8 to measure toe angles and camber angles at those positions.

The automobile body 2 supported by the hanger 1 is not lifted off the hanger 1 when the wheel mounts 5 are elevated to the position at −60 mm from the position of the wheel mount 5 when the automobile is running (when the wheel mounts 5 are elevated 30 mm from the position at −90 mm). Therefore, the maximally lifted position of the wheel mounts 5 is set to a position where the automobile body 2 reliably remains supported on the hanger 1 without being lifted off.

After the positions and the toe angles and camber angles of the wheel mounts 5 have been measured while the wheel mounts 5 are being lifted by the wheel mount lifting means 6, the arithmetic means calculates toe angles and camber angles at the position of the wheel mount 5 when the automobile is running.

Then, the arithmetic means calculates adjustments for the toe angles and camber angles at the adjusting position (the position at −60 mm from the position of the wheel mount 5 when the automobile is running) based on the toe angles and camber angles at the position of the wheel mount 5 when the automobile is running.

The calculation by the arithmetic means of a toe angle at the position of the wheel mount 5 when the automobile is running, and the calculation by the arithmetic means of an adjustment quantity for the toe angle at the adjusting position will be described below. In STEP1 shown in FIG. 4, the wheel mount 5 is lifted by the wheel mount lifting means 6, the position of the central axis of the wheel mount 5 (a=−90 mm) and the toe angle b thereof at the measurement start position are measured, and then the toe angle b is measured at each given interval (each 10 mm) until the position of the central axis of the wheel mount 5 reaches the adjusting position (a=−60 mm). From the position and toe angles thus measured, the coordinates (a, b) of the toe angle measured when the position of the central axis of the wheel mount 5 is at −90 mm are referred to as first reference coordinates J. Furthermore, the coordinates (a, b) of the toe angle measured when the position of the central axis of the wheel mount 5 is at −80 mm are referred to as first measured coordinates $J_1$. The coordinates (a, b) of the toe angle measured when the position of the central axis of the wheel mount 5 is at −70 mm are referred to as second measured coordinates $J_2$. The coordinates (a, b) of the toe angle measured when the position of the central axis of the wheel mount 5 is at −60 mm are referred to as third measured coordinates $J_3$.

Figure 4:
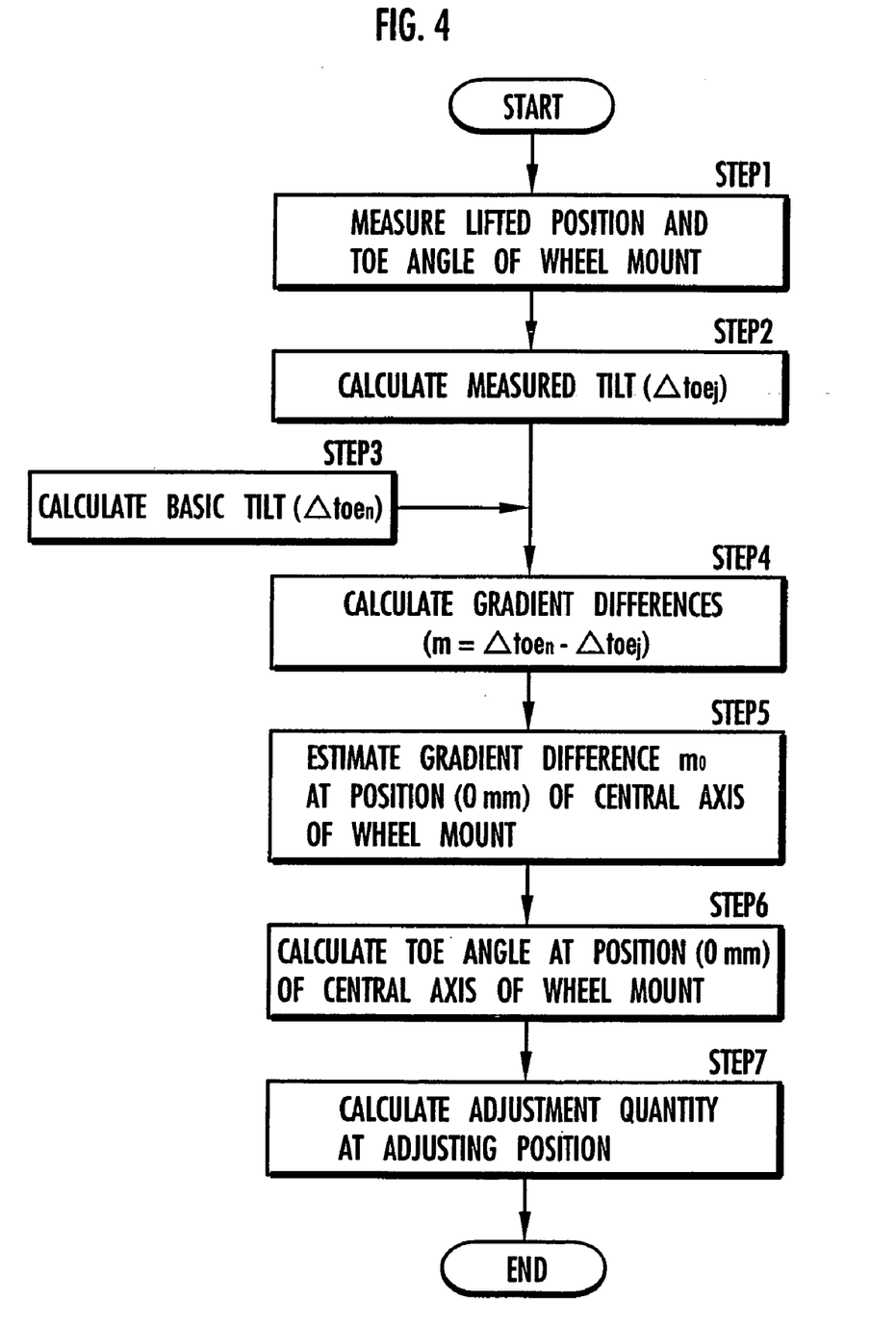
FIG. 4 is a flowchart of a method of measuring a toe angle.
Figure 5:
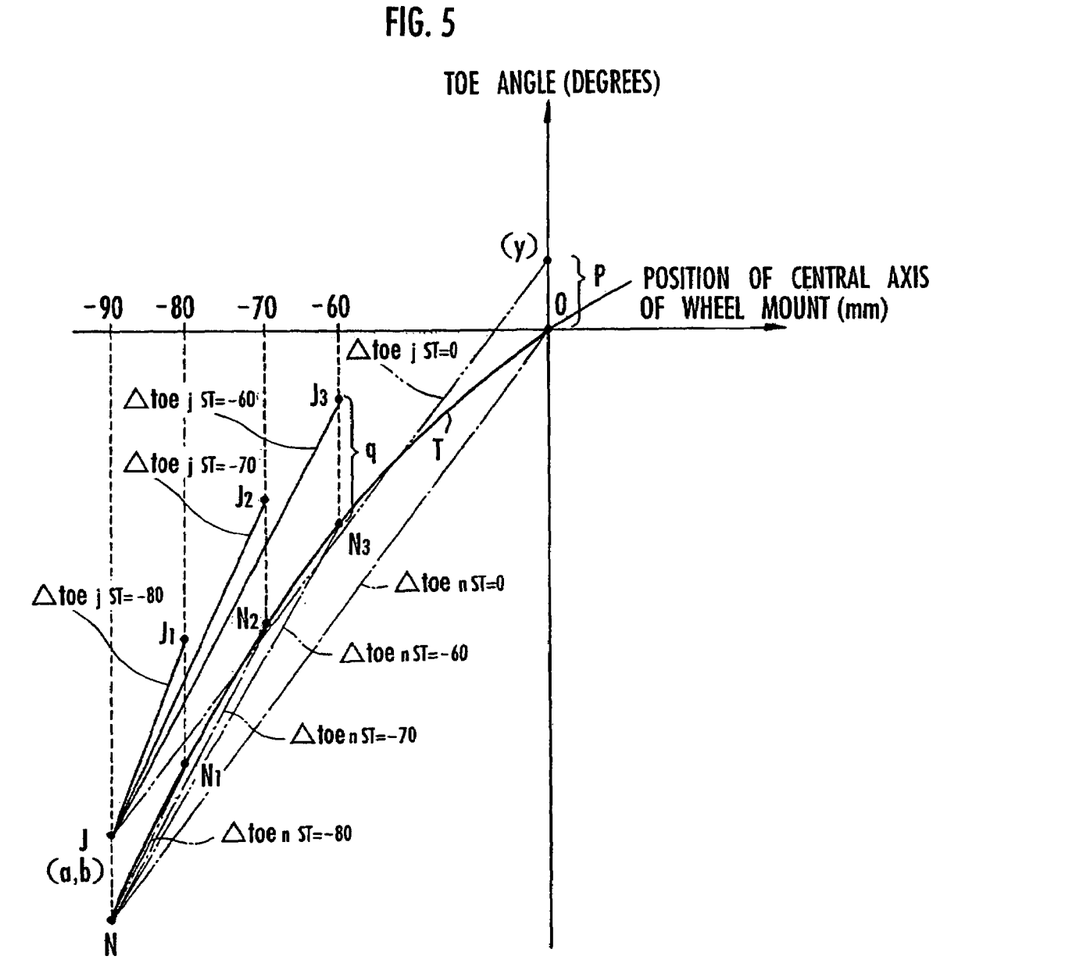
FIG. 5 is a diagram showing the relationship between the position of a wheel mount and a toe angle.

Then, as shown in FIG. 5, the gradient $\Delta \text{toe}_{j\ st=-80}$ of a straight line interconnecting the first reference coordinates J and the first measured coordinates $J_1$, the gradient $\Delta \text{toe}_{j\ st=-70}$ of a straight line interconnecting the first reference coordinates J and the second measured coordinates $J_2$, and the gradient $\Delta \text{toe}_{j\ st=-60}$ of a straight line interconnecting the first reference coordinates J and the third measured coordinates $J_3$ are calculated (see STEP2 in FIG. 4). The calculated gradients are referred to as measured gradients ($\Delta \text{toe}_j$).

The arithmetic means holds changes of the correct toe angle as they occur when the wheel mount 5 is lifted by the wheel mount lifting means 6 for each type of the automobile, recorded as a basic characteristic curve T shown in FIG. 5. On the basic characteristic curve T, the coordinates of the correct toe angle when the position of the central axis of the wheel mount 5 is at −90 mm (measurement start position) is referred to as second reference coordinates N. Similarly, the coordinates of the correct toe angle when the position of the central axis of the wheel mount 5 is at −80 mm is referred to as first set coordinates $N_1$. The coordinates of the correct toe angle when the position of the central axis of the wheel mount 5 is at −70 mm is referred to as second set coordinates $N_2$. The coordinates of the correct toe angle when the position of the central axis of the wheel mount 5 is at −60 mm is referred to as third set coordinates $N_3$. As shown in FIG. 5, the gradient $\Delta \text{toe}_{n\ st=-80}$ of a straight line interconnecting the second reference coordinates N and the first set coordinates $N_1$, the gradient $\Delta \text{toe}_{n\ st=-70}$ of a straight line interconnecting the second reference coordinates N and the second set coordinates $N_2$, and the gradient $\Delta \text{toe}_{n\ st=-60}$ of a straight line interconnecting the second reference coordinates N and the third set coordinates $N_3$ are calculated in advance (see STEP3 in FIG. 4), and the calculated gradients are stored. These stored gradients are referred to as basic gradients ($\Delta \text{toe}_n$).

In STEP4 shown in FIG. 4, the differences (m) between the respective measured gradients ($\Delta \text{toe}_j$) and the respective basic gradients ($\Delta \text{toe}_n$) are calculated.

$$m_{-80} = \Delta \text{toe}_{n\ st=-80} - \Delta \text{toe}_{j\ st=-80} \tag{1}$$

$$m_{-70} = \Delta \text{toe}_{n\ st=-70} - \Delta \text{toe}_{j\ st=-70} \tag{2}$$

$$m_{-60} = \Delta \text{toe}_{n\ st=-60} - \Delta \text{toe}_{j\ st=-60} \tag{3}$$

The gradient differences $m_{-80}$, $m_{-70}$, $m_{-60}$ are determined according to the above equations (1), (2), (3). The inventor of the present invention has found in various tests that the differences (m) between the respective measured gradients ($\Delta \text{toe}_j$) and the respective basic gradients ($\Delta \text{toe}_n$) at the respective positions of the central axis of the wheel mount 5 make a constant change. Based on the above finding, a gradient difference $m_0$ at the position (0 mm) of the central axis of the wheel mount 5 when the automobile is running is estimated from the calculated gradient differences $m_{-80}$, $m_{-70}$, $m_{-60}$ (see STEP5 in FIG. 4).

Based on the value of gradient difference $m_0$, a toe angle y at the position (0 mm) of the central axis of the wheel mount 5 when the automobile is running (representing a deviation angle p from the coordinates of the correct toe angle in FIG. 5) is calculated according to the equation (4) which represents a gradient $\Delta toe_{j\ st=0}$ (STEP6 in FIG. 4).

$$y=\alpha(x-a)+b \quad (4)$$

where $\alpha$ represents the gradient $\Delta toe_{j\ st=0}$ at the position x of the central axis of the wheel mount 5 when the automobile is running ($\alpha=\Delta toe_{j\ st=0}+m_0$). The toe angle y at the position (x=0) of the central axis of the wheel mount 5 when the automobile is running in the equation (4) can be expressed by the equation (5):

$$y=-\alpha a+b \quad (5)$$

The toe angle y thus calculated represents the toe angle at the position of the central axis of the wheel mount 5 when the automobile is running. The adjusting position for adjusting the toe angle is −60 mm from the position of the central axis of the wheel mount 5 when the automobile is running. Therefore, a corrective quantity y' corresponding to the adjusting position is added to the calculated toe angle y, thus calculating an adjustment quantity q according to the equation (6) (see STEP7 in FIG. 4).

$$q=y+y'=y+ky \quad (6)$$

The corrective quantity y' can be determined by multiplying the toe angle y by a corrective coefficient k that has been calculated in advance at the adjusting position for each type of the automobile. The toe angle is then adjusted at the adjusting position in accordance with the adjustment quantity q thus determined.

The calculation by the arithmetic means of a camber angle at the position of the wheel mount 5 when the automobile is running, and the calculation by the arithmetic means of an adjustment quantity for the camber angle at the adjusting position will be described below. In the present embodiment, camber angles and toe angles are simultaneously measured. An adjustment quantity for the camber angle at the adjusting position is determined by the arithmetic means in the same manner as with the toe angle as described above.

Figure 6:
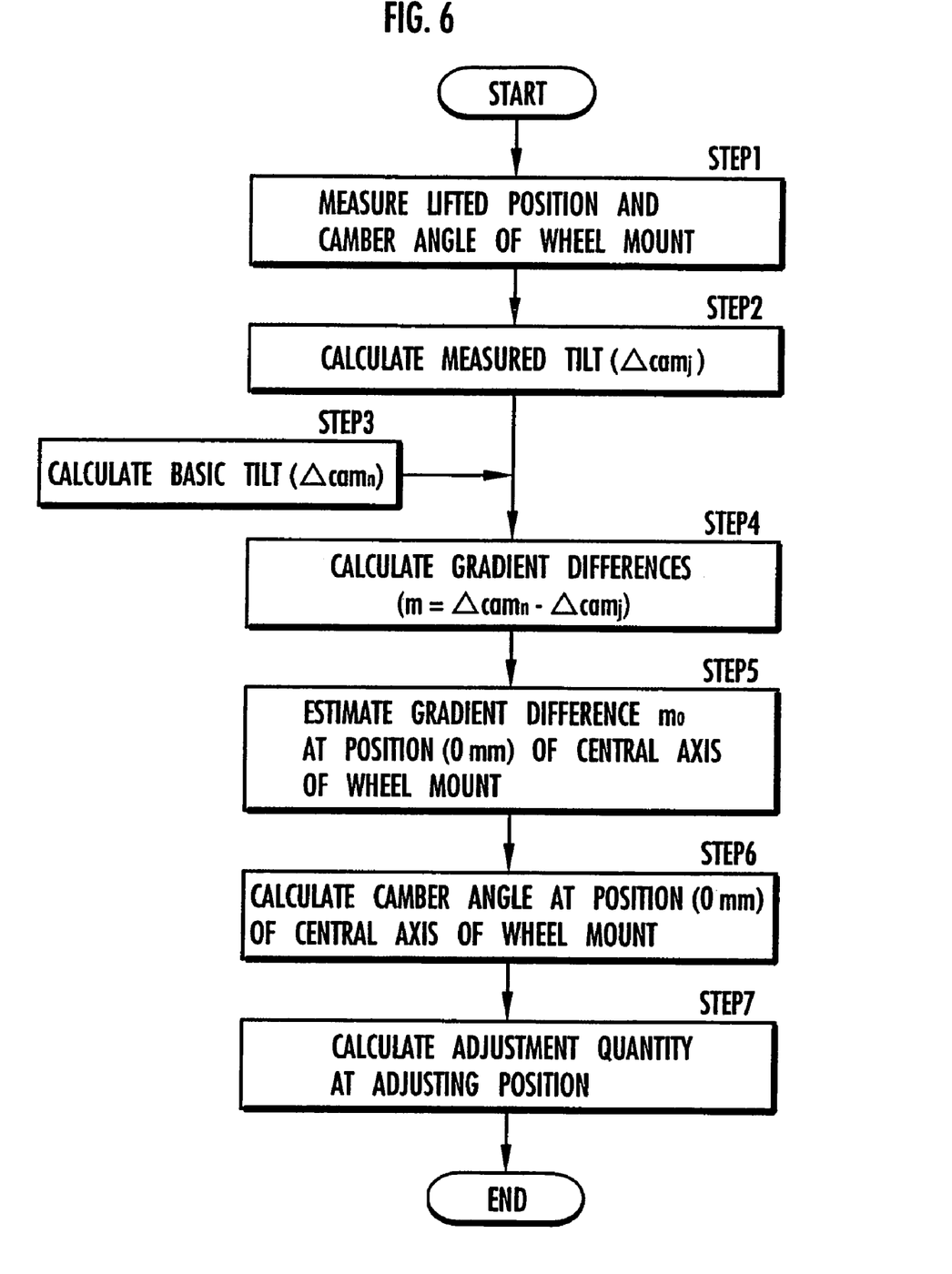
FIG. 6 is a flowchart of a method of measuring a camber angle.

In STEP1 shown in FIG. 6, at the time the wheel mount 5 starts being lifted by the wheel mount lifting means 6, the position of the central axis of the wheel mount 5 (a=−90 mm) and the camber angle b thereof are measured, and then the camber angle b is measured at each given interval (each 10 mm) until the position of the central axis of the wheel mount 5 reaches the adjusting position (a=−60 mm). From the position and camber angles thus measured, the coordinates (a, b) of the camber angle measured when the position of the central axis of the wheel mount 5 is at −90 mm are referred to as first reference coordinates j. Furthermore, the coordinates (a, b) of the camber angle measured when the position of the central axis of the wheel mount 5 is at −80 mm are referred to as first measured coordinates $J_1$. The coordinates (a, b) of the camber angle measured when the position of the central axis of the wheel mount 5 is at −70 mm are referred to as second measured coordinates $J_2$. The coordinates (a, b) of the camber angle measured when the position of the central axis of the wheel mount 5 is at −60 mm are referred to as third measured coordinates $J_3$.

Figure 7:
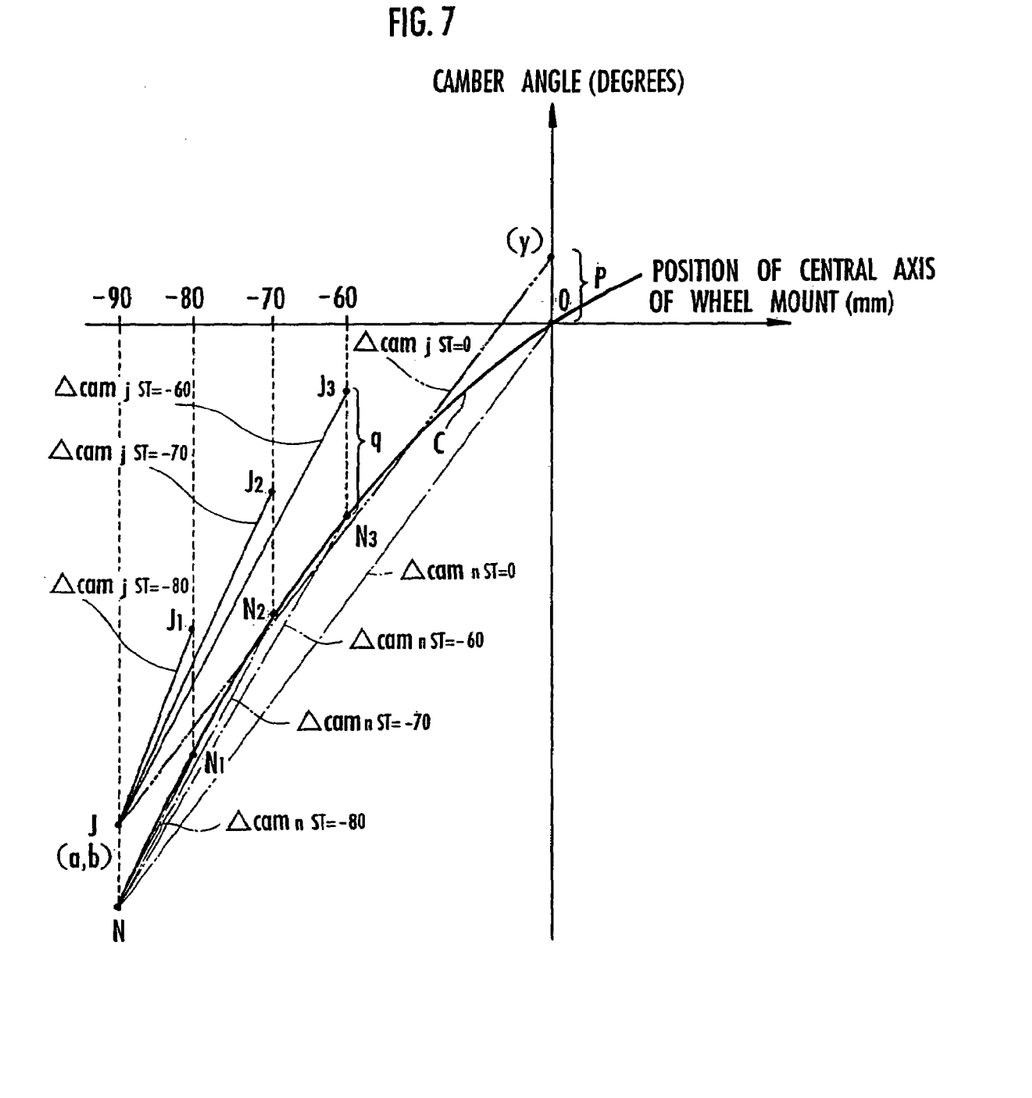
FIG. 7 is a diagram showing the relationship between the position of a wheel mount and a camber angle.

Then, as shown in FIG. 7, the gradient $\Delta cam_{j\ st=-80}$ of a straight line interconnecting the first reference coordinates J and the first measured coordinates $J_1$, the gradient $\Delta cam_{j\ st=-70}$ of a straight line interconnecting the first reference coordinates J and the second measured coordinates $J_2$, and the gradient $\Delta cam_{j\ st=-60}$ of a straight line interconnecting the first reference coordinates J and the third measured coordinates $J_3$ are calculated (see STEP2 in FIG. 6). The calculated gradients are referred to as measured gradients ($\Delta cam_j$).

The arithmetic means holds changes of the correct camber angle as they occur when the wheel mount 5 is lifted by the wheel mount lifting means 6 for each type of the automobile, recorded as a basic characteristic curve C shown in FIG. 7. On the basic characteristic curve C, the coordinates of the correct camber angle when the position of the central axis of the wheel mount 5 is at −90 mm is referred to as second reference coordinates N. Similarly, the coordinates of the correct camber angle when the position of the central axis of the wheel mount 5 is at −80 mm is referred to as first set coordinates $N_1$. The coordinates of the correct camber angle when the position of the central axis of the wheel mount 5 is at −70 mm is referred to as second set coordinates $N_2$. The coordinates of the correct camber angle when the position of the central axis of the wheel mount 5 is at −60 mm is referred to as third set coordinates $N_3$. As shown in FIG. 7, the gradient $\Delta cam_{n\ st=-80}$ of a straight line interconnecting the second reference coordinates N and the first set coordinates $N_1$, the gradient $\Delta cam_{n\ st=-70}$ of a straight line interconnecting the second reference coordinates N and the second set coordinates $N_2$, and the gradient $\Delta cam_{n\ st=-60}$ of a straight line interconnecting the second reference coordinates N and the third set coordinates $N_3$ are calculated in advance (see STEP3 in FIG. 6), and the calculated gradients are stored. These stored gradients are referred to as basic gradients ($\Delta cam_n$).

In STEP4 shown in FIG. 6, the differences (m) between the respective measured gradients ($\Delta cam_j$) and the respective basic gradients ($\Delta cam_n$) are calculated.

$$m_{-80}=\Delta cam_{n\ st=-80}-\Delta cam_{j\ st=-80} \quad (7)$$

$$m_{-70}=\Delta cam_{n\ st=-70}-\Delta cam_{j\ st=-70} \quad (8)$$

$$m_{-60}=\Delta cam_{n\ st=-60}-\Delta cam_{j\ st=-60} \quad (9)$$

The gradient differences $m_{-80}$, $m_{-70}$, $m_{-60}$ are determined according to the above equations (7), (8), (9). The inventor of the present invention has also confirmed in various tests that the differences (m) between the respective measured gradients ($\Delta cam_j$) and the respective basic gradients ($\Delta cam_n$) at the respective positions of the central axis of the wheel mount 5 make a constant change. Therefore, an estimated value $m_0$ of the gradient difference at the position (0 mm) of the central axis of the wheel mount 5 when the automobile is running is determined from the calculated gradient differences $m_{-80}$, $m_{-70}$, $m_{-60}$ (see STEP5 in FIG. 6).

A camber angle y at the position (0 mm) of the central axis of the wheel mount 5 when the automobile is running (representing a deviation angle p from the coordinates of the correct camber angle in FIG. 7) is calculated according to the above equation (5) in STEP6 in FIG. 6.

Since the adjusting position for adjusting the camber angle is −60 mm from the position of the central axis of the wheel mount 5 when the automobile is running, an adjustment quantity q is calculated according to the equation (6)

(see STEP7 in FIG. 6). A corrective coefficient k for the camber angle has been calculated in advance in the same manner as with the toe angle as described above. The camber angle is then adjusted at the adjusting position in accordance with the adjustment quantity q thus determined.

According to the present embodiment, as described above, toe angles and camber angles at the positions of the central axes of the wheel mounts 5 when the automobile is running can be calculated highly quickly without the need for applying the same load to the automobile body as the load applied when the automobile is running. Since adjustments for the toe angles and the camber angles can be obtained simply by lifting the wheel mounts 5 up to the adjusting position without having to removing the automobile body from the hanger 1, alignment can be adjusted efficiently for increased productivity.

The measurement start position, the adjusting position, and the intervals between the measured positions are determined depending on the characteristics of the suspensions of the type of the automobile that is measured, and are not limited to the dimensions adopted for the measurement of the toe angle and the camber angles in the present embodiment. The shorter the intervals between the measured positions, the higher the accuracy of the adjustment quantities.

The present invention may be employed in measuring and adjusting wheel alignment of automobiles so as to be able to measure and adjust wheel alignment of automobiles quickly and accurately for increased productivity without the need for applying the same load to the wheel mounts as the load applied when the automobile is running.

The invention claimed is:

1. A method of measuring wheel alignment of an automobile, comprising the steps of:
   supporting an automobile body with a wheel mount vertically movably mounted thereon, and lifting the wheel mount to a predetermined vertical position which is set so as to be lower than the position that the wheel mount takes when the automobile is running; and
   measuring the position of the wheel mount which is lifted and a tilt angle in a predetermined direction of the wheel mount;
   wherein said step of measuring comprises the steps of:
      calculating the gradients of straight lines respectively interconnecting first reference coordinates and measured coordinates, said first reference coordinates comprising coordinates representative of the position of the wheel mount which is measured when the wheel mount starts being lifted and the tilt angle in the predetermined direction of the wheel mount which is measured in the measured position of the wheel mount, said measured coordinates comprising a plurality of coordinates representative of the positions of the wheel mount which are measured at predetermined intervals while the wheel mount is being lifted to said predetermined vertical position and the tilt angles in the predetermined direction of the wheel mount which are measured in the respective measured positions of the wheel mount; and
      calculating an estimated value of the tilt angle in the predetermined direction of the wheel mount at the position that the wheel mount takes when the automobile is running, based on the differences between the gradients of straight lines respectively interconnecting second reference coordinates, which have been calculated in advance, and set coordinates and the gradients of the straight lines respectively interconnecting said first reference coordinates and said measured coordinates, said second reference coordinates comprising coordinates representative of the position of the wheel mount at said first reference coordinates and a predetermined correct tilt angle in the predetermined direction of the wheel mount at said position of the wheel mount, said set coordinates comprising a plurality of coordinates representative of the respective positions of the wheel mount at said measured coordinates and predetermined correct tilt angles in the predetermined direction of the wheel mount at said positions of the wheel mount.

2. A method according to claim 1, wherein said step of lifting the wheel mount comprises the step of lifting the wheel mount to a tilt angle adjusting position which is set so as to be lower than the position that the wheel mount takes when the automobile is running, said method further comprising the step of adjusting the tilt angle in the predetermined direction of the wheel mount which has been lifted to said tilt angle adjusting position after said step of measuring the position of the wheel mount, wherein said step of measuring further comprises the steps of determining a deviation from the correct tilt angle in the predetermined direction of the wheel mount at the position that the wheel mount takes when the automobile is running, from the calculated estimated value, and adding a predetermined corrective quantity to said deviation thereby to calculate an adjustment quantity for the tilt angle in the predetermined direction of the wheel mount at said tilt angle adjusting position, and said step of adjusting the tilt angle comprises the step of adjusting the tilt angle in the predetermined direction of the wheel mount at said tilt angle adjusting position based on the calculated adjustment quantity.

3. A method according to claim 1 or 2, wherein said tilt angle in the predetermined direction of said wheel mount comprises a toe angle of said wheel mount.

4. A method according to claim 1 or 2, wherein said tilt angle in the predetermined direction of said wheel mount comprises a camber angle of said wheel mount.

* * * * *